Patented Jan. 29, 1946

2,393,737

UNITED STATES PATENT OFFICE 2,393,737

PREPARATION OF UNSATURATED ESTERS

Newman M. Bortnick, Philadelphia, Pa., assignor to Röhm & Haas Company, Philadelphia, Pa., a corporation of Delaware No Drawing. Application February 20, 1945, Serial No. 578,937

9 Claims. (Cl. 260—486)

This invention relates to a process for preparing acrylic and alkacrylic esters. More particularly, this invention deals with the preparation of such esters by thermally decomposing esters of β-alkoxypropionic acid and α-hydrocarbon substituted β-alkoxypropionic acids in the presence of an alkali metal alcoholate.

It has heretofore been proposed to prepare acrylic acid and esters of acrylic acid from alkoxypropionic acid and its esters by treatment thereof with strong acids. While such methods have been operative, they present serious difficulties in plant practice. They form, for example, highly corrosive mixtures. They yield acrylic acid even when the initial material is a pure ester. They fail to give as favorable yields as is commercially desirable.

It has now been found that esters of β-alkoxypropionic acid and β-alkoxy-α-hydrocarbon substituted propionic acids are converted to acrylic and α-hydrocarbon substituted acrylic esters in good yield when heated at a temperature from about 40° C. to about 190° C., preferably 40° C. to 150° C., with a small amount of an alkali metal alcoholate as a catalyst.

A polymerization inhibitor may be present in the reaction mixture to prevent formation of polymers. Hydroquinone and copper powder are typical inhibitors for this purpose.

As an alkaline catalyst in this reaction, there is used an alkali metal alcoholate, lithium, sodium, and potassium alcoholates having been found effective. The alcoholate may desirably be used in amounts from 0.01 to 0.10 mol per mol of alkoxy ester. The alcoholate selected is preferably, but not necessarily, the same as that occurring in the ester, a pure, unmixed product then resulting, since there is no chance of ester interchange. Alcoholates which do not correspond with the alcohol residue or residues in the alkoxy esters are, however, operable and satisfactory for the preparation of the unsaturated esters.

As alkoxy esters there may be used esters of the formula:

wherein R is a primary aliphatic hydrocarbon group, R′ is an aliphatic hydrocarbon group, and X is hydrogen or a lower alkyl group, including methyl, ethyl, propyl, or butyl. The compounds in which X is hydrogen or methyl are of primary importance at the present time. The same hydrocarbon group may occur for both R and R′ or different groups may be used, in which case the unsaturated product is apt to consist of a mixture of esters as the result of alcoholysis. Typical groups for R include methyl, ethyl, propyl, butyl, hexyl, octyl, allyl, or methallyl, while R′ may be any of these groups and also decyl, dodecyl, cetyl, octadecyl, oleyl, or other aliphatic hydrocarbon group. It is preferable to have R the hydrocarbon group of an alcohol, such as methyl, ethyl, propyl, allyl, butyl, or amyl, which boils below about 150° C. so that it may be volatilized readily from the reaction mixture below this temperature at normal pressures. Hydrocarbon groups from longer chain alcohols may, however, be used and the alcohols formed therewith volatilized under reduced pressure.

The reaction may be carried out by heating the ester of an alkoxypropionic acid with an alkali metal alcoholate and, if desired, distilling the product, preferably with fractionation. In the most convenient procedure, the alcohol formed by splitting of the ether group is removed as formed so that the reaction is carried to completion. Optionally, free alcohol may be used as a solvent and distilled off as the reaction proceeds. The lower alcohols, which are those generally used, form constant boiling mixtures with the more volatile unsaturated esters. Thus, they may be removed from the reaction mixture as rapidly as formed at the lowest feasible temperature.

Details of the preparation of typical unsaturated esters are shown in the following examples.

Example 1

In to a flask equipped with a distilling column was run 100 grams of methyl β-methoxyisobutyrate, CH₃OCH₂CH(CH₃)COOCH₃. About three grams of dry sodium methoxide was added thereto. The flask and contents were heated and all of the liquid distilled from the flask. Temperatures of distillation rose from 63° C. to 150° C. in the vapor and 90° C. to 180° C. in the pot. By analysis, it was found that 50% of the distillate was methyl methacrylate. A gram of sodium methoxide was added thereto and the liquid redistilled. The product was treated with 40% calcium chloride brine to remove the methanol formed in the reaction. The remaining organic liquid was dried with potassium carbonate and distilled. A yield of 80% of methyl methacrylate was thus obtained.

Example 2

A solution of sodium methoxide (0.05 mol) and hydroquinone (0.005 mol) in methanol (10 cc.) was placed in a flask fitted with a fractionating column and a dropping funnel. This solution was heated and methyl β-methoxyisobutyrate (1.0 mol) was added gradually while the cleavage products were distilled off. Cleavage was very rapid at 90° C. The yield of methyl methacrylate was 85% of the theory.

*Example 3*

A solution of 0.25 gram of sodium was made in 10 cc. of absolute ethanol. To this solution was added 50 grams of ethyl β-ethoxypropionate. The mixture was heated below 100° C. and the liquids distilled. The product of this single distillation contained ethyl acrylate corresponding to 70% of the original ethyl β-ethoxypropionate.

*Example 4*

Sodium methoxide (3 grams) was placed in a flask fitted with a fractionating column containing copper packing and a dropping funnel. Copper turnings were placed in the flask to act as the polymerization inhibitor. Methyl β-methoxyisobutyrate (0.50 mol) dissolved in methanol (172 grams) was added gradually, and a 10%-15% solution of methyl methacrylate was obtained in the distillate. No appreciable polymerization took place. The yield of methyl methacrylate was 92.5%.

In place of the methyl and ethyl esters used above, there may be used esters, such as the propyl, butyl, octyl, dodecyl, or higher esters of methoxypropionate, ethoxypropionate, methoxyisobutyrate, ethoxyisobutyrate, or other alkoxy propionic acid or substituted propionic acid having an aliphatic hydrocarbon group in the alpha position. The lower alkoxypropionates, wherein R' is an alkyl group of one to four carbon atoms, yield acrylates and methacrylates of great use in the plastic arts.

I claim:

1. A process for preparing esters of acrylic and α-alkacrylic acids which comprises heating at a temperature between 40° C. and about 190° C. in the liquid phase in the presence of an alkali metal alcoholate an ester of the formula

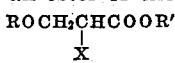

wherein R is a primary aliphatic hydrocarbon group, R' is an aliphatic hydrocarbon group, and X is a member of the class consisting of hydrogen and lower alkyl groups.

2. A process for preparing esters of acrylic and α-alkacrylic acids which comprises heating at temperatures of 40° C. to about 190° C. in the liquid phase in the presence of an alkali metal alcoholate an ester of the formula

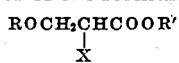

wherein R is a primary aliphatic hydrocarbon group of one to eight carbon atoms, R' is a primary aliphatic hydrocarbon group of one to eighteen carbon atoms, and X is a member of the class consisting of hydrogen and lower alkyl groups.

3. A process for preparing esters of acrylic acid which comprises heating at temperatures of 40° C. to about 190° C. in the liquid phase in the presence of an alkali metal alcoholate an ester of the formula

ROCH₂CH₂COOR' wherein R is a primary aliphatic hydrocarbon group of one to eight carbon atoms and R' is a primary alkyl group of one to four carbon atoms.

4. A process for preparing esters of α-alkacrylic acids which comprises heating at temperatures of 40° C. in the liquid phase in the presence of an alkali metal alcoholate an ester of the formula

wherein R is a primary aliphatic hydrocarbon group of one to eight carbon atoms, R' is a primary alkyl group of one to four carbon atoms, and X is a lower alkyl group.

5. A process for preparing esters of methacrylic acid which comprises heating at temperatures of 40° C. to 190° C. in the liquid phase in the presence of an alkali metal alcoholate an ester of the formula

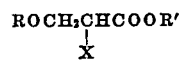

wherein R is a primary aliphatic hydrocarbon group of one to eight carbon atoms and R' is a primary alkyl group of one to four carbon atoms.

6. A process for preparing esters of methacrylic acid which comprises heating at temperatures above 40° C. and below 190° C. in the liquid phase in the presence of an alkali metal alcoholate an ester of the formula

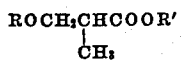

wherein R' is a primary alkyl group of one to four carbon atoms.

7. A process for preparing methyl methacrylate which comprises heating at temperatures above 40° C. and below 190° C. in the liquid phase in the presence of an alkali metal alcoholate an ester of the formula

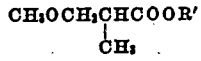

8. A process for preparing esters of acrylic acid which comprises heating at temperatures of 40° C. to about 190° C. in the liquid phase in the presence of an alkali metal alcoholate an ester of the formula

CH₃OCH₂CH₂COOR' wherein R' is a primary alkyl group of one to four carbon atoms.

9. A process for preparing methyl acrylate which comprises heating at temperatures above 40° C. and below 190° C. in the liquid phase in the presence of an alkali metal alcoholate an ester of the formula

CH₃OCH₂CH₂COOCH₃

NEWMAN M. BORTNICK.